US011804235B2

(12) United States Patent
Wu et al.

(10) Patent No.: US 11,804,235 B2
(45) Date of Patent: Oct. 31, 2023

(54) DOUBLE-TALK STATE DETECTION METHOD AND DEVICE, AND ELECTRONIC DEVICE

(71) Applicant: Baidu Online Network Technology (Beijing) Co., Ltd., Beijing (CN)

(72) Inventors: Junnan Wu, Beijing (CN); Yangfei Xu, Beijing (CN); Jun Ning, Beijing (CN); Yuzhou Gong, Beijing (CN); Nan Zhou, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 297 days.

(21) Appl. No.: 17/169,035

(22) Filed: Feb. 5, 2021

(65) Prior Publication Data

US 2021/0264935 A1 Aug. 26, 2021

(30) Foreign Application Priority Data

Feb. 20, 2020 (CN) .......................... 202010105947.4

(51) Int. Cl.
*G10L 21/0232* (2013.01)
*G10L 25/18* (2013.01)
(Continued)

(52) U.S. Cl.
CPC .......... *G10L 21/0232* (2013.01); *G10L 25/18* (2013.01); *G10L 25/21* (2013.01);
(Continued)

(58) Field of Classification Search
CPC ... H04M 9/082; H04M 3/002; G10L 21/0208; G10L 2021/02082; G10L 21/0232;
(Continued)

(56) References Cited

U.S. PATENT DOCUMENTS 7,764,783 B1 * 7/2010 Pai .................. H04M 9/082
379/406.08
8,175,871 B2 * 5/2012 Wang .................. H04M 9/082
379/406.01

(Continued)

FOREIGN PATENT DOCUMENTS

CN 105957520 A 9/2016
CN 107742522 A * 2/2018 ............ G10L 15/04

(Continued)

OTHER PUBLICATIONS

Chinese Office Action for Chinese application No. CN2020101059474, dated Apr. 19, 2022.

(Continued)

*Primary Examiner* — Akelaw Teshale
(74) *Attorney, Agent, or Firm* — Quinn IP Law PLLC (57) ABSTRACT

A double-talk state detection method includes: calculating an energy ratio between a first energy of an error signal in each sub-band of M sub-bands and a second energy of a filtered signal in the same sub-band as the error signal, thereby obtaining M energy ratios, where the error signal is a difference between an input signal collected by a microphone and the filtered signal, the filtered signal is a signal obtained after performing filtering process on a reference signal, and M is a positive integer; performing a first smoothing processing on the M energy ratios to obtain M first energy smoothing ratios, and performing a second smoothing processing on the M first energy smoothing ratios to obtain M second energy smoothing ratios; performing double-talk state detection based on the M first energy smoothing ratios and the M second energy smoothing ratios to determine a state of the input signal.

15 Claims, 4 Drawing Sheets

(51) Int. Cl.
*G10L 25/21* (2013.01)
*G10L 25/51* (2013.01)
*H04M 3/00* (2006.01)
*H04M 9/08* (2006.01)
*G10L 21/0208* (2013.01)

(52) U.S. Cl.
CPC ............. *G10L 25/51* (2013.01); *H04M 3/002* (2013.01); *H04M 9/082* (2013.01); *G10L 2021/02082* (2013.01)

(58) Field of Classification Search
CPC ......... G10L 25/78; G10L 25/18; G10L 25/21; G10L 25/51; G10L 19/0204; G10L 21/0216; H04B 3/234; H04B 3/23; H04B 3/237; H04B 3/20; H04R 3/005; H04R 3/02; H04R 2499/13
See application file for complete search history.

(56) References Cited

U.S. PATENT DOCUMENTS

| | | | | |
|---|---|---|---|---|
| 8,472,616 | B1* | 6/2013 | Jiang | H04M 9/082 |
| | | | | 379/406.01 |
| 8,934,622 | B2* | 1/2015 | Chi | H04M 3/002 |
| | | | | 379/406.01 |
| 10,115,411 | B1* | 10/2018 | Chu | G10L 21/0232 |
| 10,863,269 | B2* | 12/2020 | Bou Daher | G10L 25/21 |
| 10,937,441 | B1* | 3/2021 | Kristjansson | G10L 21/0264 |
| 2002/0103636 | A1* | 8/2002 | Tucker | G10L 25/78 |
| | | | | 704/205 |
| 2004/0057574 | A1* | 3/2004 | Faller | H04M 9/082 |
| | | | | 379/406.01 |
| 2006/0018459 | A1* | 1/2006 | McCree | H04M 9/082 |
| | | | | 379/406.06 |
| 2006/0018460 | A1* | 1/2006 | McCree | H04M 9/082 |
| | | | | 379/406.08 |
| 2006/0147032 | A1* | 7/2006 | McCree | H04M 9/082 |
| | | | | 379/406.03 |
| 2008/0240414 | A1 | 10/2008 | Mohammad et al. | |
| 2009/0185674 | A1* | 7/2009 | Sorensen | H04M 9/085 |
| | | | | 379/406.01 |
| 2010/0056063 | A1 | 3/2010 | Sudo | |
| 2010/0135483 | A1 | 6/2010 | Mohammad et al. | |
| 2010/0150376 | A1* | 6/2010 | Itou | H04M 9/082 |
| | | | | 381/94.1 |
| 2014/0064476 | A1* | 3/2014 | Mani | H04M 3/002 |
| | | | | 379/406.08 |
| 2019/0104360 | A1* | 4/2019 | Bou Daher | H04R 1/406 |

FOREIGN PATENT DOCUMENTS

| | | | | |
|---|---|---|---|---|
| CN | 108172233 A | | 6/2018 | |
| CN | 108806713 A | | 11/2018 | |
| CN | 109256145 A | | 1/2019 | |
| CN | 110634496 A | | 12/2019 | |
| CN | 111161748 A | * | 5/2020 | ......... G10L 19/0204 |
| EP | 1521240 A1 | * | 4/2005 | ............. G10L 19/04 |
| EP | 2828851 B1 | * | 4/2016 | ............. G10L 21/02 |
| EP | 2973557 B1 | * | 5/2017 | ......... G10L 21/0208 |
| EP | 3796629 A1 | * | 3/2021 | ............... H04B 3/32 |
| JP | 2007110527 A | | 4/2007 | |
| JP | 2010055024 A | | 3/2010 | |
| JP | 2012510779 A | | 5/2012 | |
| WO | WO-2013142647 A1 | * | 9/2013 | ............. G10L 21/02 |
| WO | 2014150211 A1 | | 9/2014 | |

OTHER PUBLICATIONS

Japanese Office Action for Japanese application No. JP2021019188, dated Mar. 25, 2022.
Extended European Search Report dated May 28, 2021 for EP application No. EP21155668.
Wu Chao, Fu Qiang, Yan Yonghong, "A Noise-Robust Double Talk Detection Algorithm", China, The 12th National Conference on Human-Machine Voice Communication, 2013.
Korean Office Action for Korean application No. 10-2021-0019091, dated Jan. 12, 2023.
Jung et al., "A new double-talk detector using echo path estimation", Seoul National University, School of Electrical Engineering, Sep. 30, 2004, Republic of Korea, p. 41-50.

* cited by examiner

FIG. 5

DOUBLE-TALK STATE DETECTION METHOD AND DEVICE, AND ELECTRONIC DEVICE

CROSS-REFERENCE TO RELATED APPLICATION

The present application claims a priority to the Chinese patent application No. 202010105947.4 filed in China on Feb. 20, 2020, a disclosure of which is incorporated herein by reference in its entirety.

TECHNICAL FIELD

The present application relates to the field of voice technique in computer technologies, and in particular to a double-talk state detection method, a double-talk state detection device and an electronic device.

BACKGROUND

In some electronic devices, such as smart speakers that may perform voice interaction, acoustic echo cancellation (AEC) plays a key role, and effects of the acoustic echo cancellation directly affect voice interaction performance of the smart speakers. For another example, when using an electronic device to make a call, the quality of the call can be improved by using the acoustic echo cancellation. In the AEC algorithm, in order to better eliminate a far-end reference signal and protect a near-end voice signal, a double-talk detection module is usually provided. The double-talk detection module is used to detect a current signal state: single-talk state or double-talk state. The single-talk state means that there is only far-end reference signal. The double-talk state means that there are both a near-end speaker's voice signal and a far-end reference signal.

An existing double-talk state detection method adopts a full-band energy ratio method, in which a residual signal energy of a signal collected by a microphone after being processed by a linear filter is compared with a signal energy of a loudspeaker, and it is judged as a double-talk state if a ratio is greater than a set detection threshold, otherwise it is judged as a single-talk state.

However, when using the foregoing double-talk state detection method for performing state detection, if an energy of a reference signal is larger or an energy of a near-end signal is smaller (for example, a speaker's voice is smaller), misjudgment is easy to occur, which easily leads to poor accuracy of state detection.

SUMMARY

The present application provides a double-talk state detection method, a double-talk state detection device and an electronic device, to solve the problem of poor accuracy of double-talk state detection.

In a first aspect, one embodiment of the present application provides a double-talk state detection method, including:

calculating an energy ratio between a first energy of an error signal in each sub-band of M sub-bands and a second energy of a filtered signal in the same sub-band as the error signal, thereby obtaining M energy ratios; wherein the error signal is a difference between an input signal collected by a microphone and the filtered signal, the filtered signal is a signal obtained after performing filtering process on a reference signal, and M is a positive integer;

performing a first smoothing processing on the M energy ratios to obtain M first energy smoothing ratios, and performing a second smoothing processing on the M first energy smoothing ratios to obtain M second energy smoothing ratios;

performing double-talk state detection based on the M first energy smoothing ratios and the M second energy smoothing ratios to determine a state of the input signal.

In the dual-talk state detection method according to one embodiment of the present application, the first smoothing processing is performed on the energy ratio between the first energy of the error signal in each sub-band of M sub-bands and the second energy of the filtered signal in the same sub-band as the error signal, and the obtained M first energy smoothing ratios are more stable, thereby reducing influence of abnormal energy ratio in the M energy ratios caused by abnormality of the error signal in one sub-band, on accuracy of state detection. Further, the second smoothing processing is performed on the M first energy smoothing ratios which are obtained after the first smoothing processing, and the obtained M second energy smoothing ratios are more stable, thereby reducing influence of individual abnormal ratio in the M first energy smoothing ratios on the accuracy of state detection. Therefore, performing dual-talk state detection based on the M first energy smoothing ratios and the M second energy smoothing ratios can improve the accuracy of state detection.

Optionally, the performing double-talk state detection based on the M first energy smoothing ratios and the M second energy smoothing ratios to determine a state of the input signal, includes:

predicting noise of the M second energy smoothing ratios according to the M second energy smoothing ratios;

obtaining signal-to-noise ratios of the M energy ratios according to the M first energy smoothing ratios and the noise of the M second energy smoothing ratios;

performing double-talk state detection according to the signal-to-noise ratios of the M energy ratios and a preset threshold to determine the state of the input signal.

In this embodiment, the M first energy smoothing ratios and the predicted noise of the M second energy smoothing ratios are used to calculate the signal-to-noise ratios of the energy ratios, and the signal-to-noise ratios of the energy ratios are used for double-talk state detection, thereby improving detection accuracy.

Optionally, the filtered signal includes N frame filtered sub-signals, and the error signal includes N frame error sub-signals, where N is a positive integer;

an energy ratio in a target sub-band includes N sub-energy ratios in the target sub-band; the N sub-energy ratios in the target sub-band includes an energy ratio between a first energy of each frame error sub-signal in the target sub-band and a second energy of a corresponding frame filtered sub-signal in the target sub-band; a first energy smoothing ratio in the target sub-band includes N first sub-energy smoothing ratios obtained after performing a first smoothing processing on the N sub-energy ratios; a second energy smoothing ratio in the target sub-band includes N second sub-energy smoothing ratios obtained after performing a second smoothing processing on the N first sub-energy smoothing ratios; the target sub-band is any sub-band of the M sub-bands.

In this embodiment, framing processing is performed on the error signal and the filtered signal. By calculating an energy ratio of the first energy between each frame error sub-signal in the N frame error sub-signals in the target sub-band and the second energy of the corresponding frame filter sub-signal in the target sub-band, N sub-energy ratios in the target sub-band can be obtained. The energy ratio in the target sub-band includes the N sub-energy ratios in the target sub-band. Since there are M sub-bands, N sub-energy ratios in each sub-band of the M sub-bands can be obtained. The N sub-energy ratios in each sub-band of the M sub-bands are used as the basis of double-talk state detection, thereby improving the accuracy of state detection.

Optionally, the first smoothing processing is performed on the M energy ratios with the following formula:

$$\text{ratio\_short\_sm}(n+1,k) = \alpha * \text{ratio\_short\_sm}(n,k) + (1-\alpha) * \text{ratio}(n+1,k)$$

wherein $\alpha$ is a first smoothing factor; ratio(n+1,k) is a sub-energy ratio between a first energy of a (n+1)-th frame error sub-signal in a k-th sub-band and a second energy of a (n+1)-th frame filtered sub-signal in the k-th sub-band; ratio_short_sm(n+1,k) is a first sub-energy smoothing ratio obtained after performing a first smoothing processing performed on ratio(n+1,k); ratio_short_sm(n,k) is a first sub-energy smoothing ratio obtained after performing a first smoothing processing on ratio(n,k); ratio(n,k) is a sub-energy ratio between a first energy of an n-th frame error sub-signal in the k-th sub-band and a second energy of an n-th frame filtered sub-signal in the k-th sub-band; n is a positive integer, and n≤N−1; k is a positive integer, and k≤M, ratio_short_sm(1,k) is equal to ratio(1,k), ratio(1,k) is a sub-energy ratio between a first energy of a first frame error sub-signal in the k-th sub-band and a second energy of a first frame filtered sub-signal in the k-th sub-band.

Through the foregoing first smoothing processing, the obtained M first energy smoothing ratios are more stable relative to the M energy ratios, and the double-talk state detection is performed accordingly to improve the detection accuracy.

Optionally, the second smoothing processing is performed on the M first energy smoothing ratios with the following formula:

$$\text{ratio\_long\_sm}(n+1,k) = \beta * \text{ratio\_long\_sm}(n,k) + (1-\beta) * \text{ratio\_short\_sm}(n+1,k)$$

wherein $\beta$ is a second smoothing factor, ratio_long_sm(n+1,k) is a second sub-energy smoothing ratio obtained after performing a second smoothing processing on ratio_short_sm(n+1,k); ratio_short_sm(n+1,k) is a first sub-energy smoothing ratio obtained after performing a first smoothing processing on ratio(n+1,k); ratio(n+1,k) is a sub-energy ratio between a first energy of a (n+1)-th frame error sub-signal in a k-th sub-band and a second energy of a (n+1)-th frame filtered sub-signal in the k-th sub-band; ratio_long_sm(n,k) is a second sub-energy smoothing ratio obtained after performing a second smoothing processing on ratio_short_sm (n,k); ratio_short_sm(n,k) is a first sub-energy smoothing ratio obtained after performing a first smoothing processing on ratio(n,k); ratio(n,k) is a sub-energy ratio between a first energy of an n-th frame error sub-signal in the k-th sub-band and a second energy of an n-th frame filtered sub-signal in the k-th sub-band; n is a positive integer, and n≤N−1; k is a positive integer, and k≤M, ratio_long_sm(1,k) is equal to ratio_short_sm(1,k).

Through the foregoing second smoothing processing, the obtained M second energy smoothing ratios are more stable relative to the M first energy smoothing ratios, and the double-talk state detection is performed accordingly to improve the detection accuracy.

Optionally, the performing double-talk state detection according to the signal-to-noise ratios of the M energy ratios and a preset threshold to determine the state of the input signal, includes:

calculating a total sum of signal-to-noise ratios of I energy ratios in the signal-to-noise ratios of the M energy ratios, wherein I is a positive integer, and in case that the total sum is greater than the preset threshold, determining that the input signal is in a double-talk state, or, in case that the total sum is less than or equal to the preset threshold, determining that the input signal is in a single-talk state.

In this embodiment, the double-talk state detection is performed according to a sum of signal-to-noise ratios of energy ratios (i.e., I energy ratios) with corresponding sub-bands of sub-frequency ranges in the first frequency range, in the M energy ratios. In this way, not only an amount of calculation can be reduced but also the detection accuracy can be improved.

In a second aspect, one embodiment of the present application provides a double-talk state detection device, including:

a first calculation module configured to calculate an energy ratio between a first energy of an error signal in each sub-band of M sub-bands and a second energy of a filtered signal in the same sub-band as the error signal, thereby obtaining M energy ratios; wherein the error signal is a difference between an input signal collected by a microphone and the filtered signal, the filtered signal is a signal obtained after performing filtering process on a reference signal, and M is a positive integer;

a smoothing module configured to perform a first smoothing processing on the M energy ratios to obtain M first energy smoothing ratios, and perform a second smoothing processing on the M first energy smoothing ratios to obtain M second energy smoothing ratios;

a state detection module configured to perform double-talk state detection based on the M first energy smoothing ratios and the M second energy smoothing ratios to determine a state of the input signal.

Optionally, the state detection module includes:

a noise prediction module configured to predict noise of the M second energy smoothing ratios according to the M second energy smoothing ratios;

a signal-to-noise ratio obtaining module configured to obtain signal-to-noise ratios of the M energy ratios according to the M first energy smoothing ratios and the noise of the M second energy smoothing ratios;

a state determination module configured to perform double-talk state detection according to the signal-to-noise ratios of the M energy ratios and a preset threshold to determine the state of the input signal.

Optionally, the filtered signal includes N frame filtered sub-signals, and the error signal includes N frame error sub-signals, where N is a positive integer;

an energy ratio in a target sub-band includes N sub-energy ratios in the target sub-band; the N sub-energy ratios in the target sub-band includes an energy ratio between a first energy of each frame error sub-signal in the target sub-band and a second energy of a corresponding frame filtered sub-signal in the target sub-band; a first energy smoothing ratio in the target sub-band includes N first sub-energy smoothing ratios obtained after performing a first smoothing processing on the N sub-energy ratios; a second energy smoothing ratio in the target sub-band includes N second sub-energy smoothing ratios obtained after performing a second smoothing processing on the N first sub-energy smoothing ratios; the target sub-band is any sub-band of the M sub-bands.

Optionally, the smoothing module performs the first smoothing processing on the M energy ratios with the following formula:

$$\text{ratio\_short\_}sm(n+1,k)=\alpha*\text{ratio\_short\_}sm(n,k)+(1-\alpha)*\text{ratio}(n+1,k)$$

wherein $\alpha$ is a first smoothing factor; ratio(n+1,k) is a sub-energy ratio between a first energy of a (n+1)-th frame error sub-signal in a k-th sub-band and a second energy of a (n+1)-th frame filtered sub-signal in the k-th sub-band; ratio_short_sm(n+1,k) is a first sub-energy smoothing ratio obtained after performing a first smoothing processing performed on ratio(n+1,k); ratio_short_sm(n,k) is a first sub-energy smoothing ratio obtained after performing a first smoothing processing on ratio(n,k); ratio(n,k) is a sub-energy ratio between a first energy of an n-th frame error sub-signal in the k-th sub-band and a second energy of an n-th frame filtered sub-signal in the k-th sub-band; n is a positive integer, and n≤N−1; k is a positive integer, and k≤M, ratio_short_sm(1,k) is equal to ratio(1,k), ratio(1,k) is a sub-energy ratio between a first energy of a first frame error sub-signal in the k-th sub-band and a second energy of a first frame filtered sub-signal in the k-th sub-band.

Optionally, the smoothing module performs the second smoothing processing on the M energy smoothing ratios with the following formula:

$$\text{ratio\_long\_}sm(n+1,k)=\beta*\text{ratio\_long\_}sm(n,k)+(1-\beta)*\text{ratio\_short\_}sm(n+1,k)$$

wherein $\beta$ is a second smoothing factor, ratio_long_sm(n+1,k) is a second sub-energy smoothing ratio obtained after performing a second smoothing processing on ratio_short_sm(n+1,k); ratio_short_sm(n+1,k) is a first sub-energy smoothing ratio obtained after performing a first smoothing processing on ratio(n+1,k); ratio(n+1,k) is a sub-energy ratio between a first energy of a (n+1)-th frame error sub-signal in a k-th sub-band and a second energy of a (n+1)-th frame filtered sub-signal in the k-th sub-band; ratio_long_sm(n,k) is a second sub-energy smoothing ratio obtained after performing a second smoothing processing on ratio_short_sm (n,k); ratio_short_sm(n,k) is a first sub-energy smoothing ratio obtained after performing a first smoothing processing on ratio(n,k); ratio(n,k) is a sub-energy ratio between a first energy of an n-th frame error sub-signal in the k-th sub-band and a second energy of an n-th frame filtered sub-signal in the k-th sub-band; n is a positive integer, and n≤N−1; k is a positive integer, and k≤M, ratio_long_sm(1,k) is equal to ratio_short_sm(1,k).

Optionally, the state determination module for determining the state of the input signal, includes:

a sum module configured to calculate a total sum of signal-to-noise ratios of I energy ratios in the signal-to-noise ratios of the M energy ratios, wherein I is a positive integer, and I≤M;

in case that the total sum is greater than the preset threshold, determine that the input signal is in a double-talk state, or, in case that the total sum is less than or equal to the preset threshold, determine that the input signal is in a single-talk state.

In a third aspect, one embodiment of the present application provides an electronic device, including:

at least one processor; and a memory communicatively connected to the at least one processor; wherein, the memory stores instructions executable by the at least one processor to enable the at least one processor to implement the method of any embodiment of the present application.

In a fourth aspect, one embodiment of the present application provides a non-transitory computer-readable storage medium storing computer instructions for causing the computer to perform the method of any embodiment of the present application.

BRIEF DESCRIPTION OF THE DRAWINGS

The drawings are included to provide a better understanding of the application and are not to be construed as limiting the present application. Wherein.

DETAILED DESCRIPTION

Reference will now be made in detail to the exemplary embodiments of the present application, examples of which are illustrated in the accompanying drawings, wherein the various details of the embodiments of the present application are included to facilitate understanding and are to be considered as exemplary only. Accordingly, a person skilled in the art should appreciate that various changes and modifications can be made to the embodiments described herein without departing from the scope and spirit of the present application. Also, descriptions of well-known functions and structures are omitted from the following description for clarity and conciseness.

Figure 1:
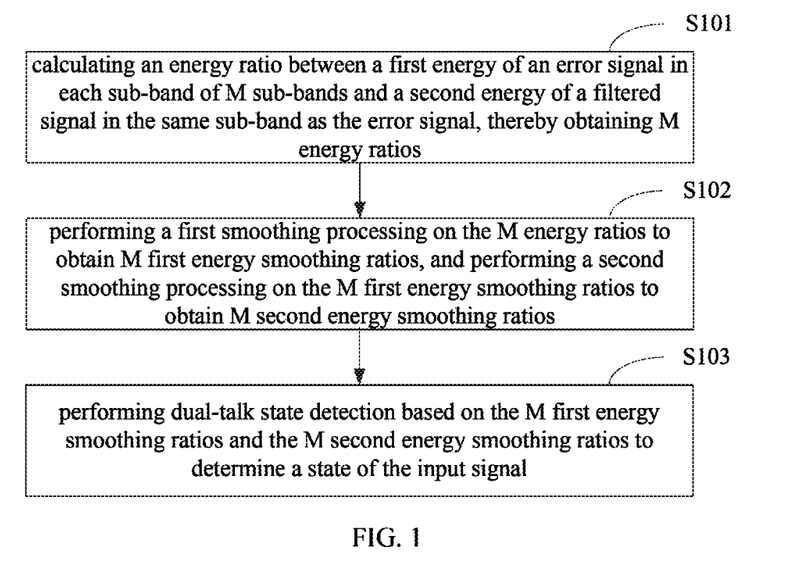
FIG. 1 is a first schematic flowchart of a double-talk state detection method according to an embodiment of the present application.

As shown in FIG. 1, according to one embodiment of the present application, the present application provides a double-talk state detection method, which may be applied to an electronic device such as a smart speaker. The foregoing method includes the following steps.

Step S101: calculating an energy ratio between a first energy of an error signal in each sub-band of M sub-bands and a second energy of a filtered signal in the same sub-band as the error signal, thereby obtaining M energy ratios.

The error signal is a difference between an input signal collected by a microphone and the filtered signal, the filtered signal is a signal obtained after performing filtering process on a reference signal, and M is a positive integer. As an example, a linear filter may be used to perform the filtering process on the reference signal. It should be noted that the foregoing reference signal may be understood as a signal transmitted to a speaker of the electronic device for playback. A microphone of the electronic device can collect the input signal. If the speaker of the electronic device is playing, the input signal collected by the microphone may include a collected signal of a signal played by the speaker and a near-end voice signal (for example, there may be a user speaking, etc.)

In frequency domain, a frequency band may be divided into multiple sub-bands, and each sub-band is corresponding to a certain frequency range. For example, for a frequency band of 0-100 Hz, it may be divided into 5 sub-bands, and each sub-band is corresponding to a sub-frequency range of 20 Hz. The sub-frequency ranges corresponding to the 5 sub-bands are 0-20 Hz, 20-40 Hz, 40-60 Hz, 60-80 Hz, and 80-100 Hz, respectively. In this embodiment, a frequency band may be preset, and the frequency band may be related to a frequency range of signals that the electronic device can handle. For example, for a smart speaker, as an example, a frequency band may be 3000 Hz. Further, frequency division may be performed on the preset frequency band in advance to obtain M sub-bands.

The error signal in any one sub-band of the M sub-bands is a difference between an input signal in the any one sub-band and a filtered signal in the any one sub-band. For any sub-band, an energy ratio between a first energy of the error signal in the sub-band and a second energy of the filtered signal in the sub-band can be calculated, that is, each energy ratio is a ratio of energies of the error signal and the filtered signal in an identical sub-band. In other words, the energy ratio between the first energy of the error signal in each sub-band and the second energy of the filtered signal in the same sub-band as the error signal, may be understood as an energy ratio between the first energy of the error signal and the second energy of the filtered signal in each identical sub-band, so that the obtained M energy ratios include the energy ratio between the first energy of the error signal and the second energy of the filtered signal in each identical sub-band. That is, each energy ratio has a corresponding sub-band, and the M energy ratios may be understood as the energy ratios in the M sub-bands. For example, if M sub-bands include a first sub-band and a second sub-band, i.e., M is 2, then an energy ratio between a first energy of the error signal in the first sub-band and a second energy of the filtered signal in the first sub-band is calculated, and an energy ratio between a first energy of the error signal in the second sub-band and a second energy of the filtered signal in the second sub-band is calculated. In this way, two energy ratios are obtained.

Step S102: performing a first smoothing processing on the M energy ratios to obtain M first energy smoothing ratios, and performing a second smoothing processing on the M first energy smoothing ratios to obtain M second energy smoothing ratios.

After obtaining the M energy ratios, the first smoothing processing can be performed to obtain the M first energy smoothing ratios. Then, the second smoothing processing can be performed on the M first energy smoothing ratios to obtain the M second energy smoothing ratios. By performing the first smoothing processing on the M energy ratios, the obtained M first energy smoothing ratios are more stable relative to the M energy ratios, thereby reducing influence of abnormal energy ratio in the M energy ratios caused by abnormality of the error signal in one sub-band, on accuracy of state detection. Then, the second smoothing processing is performed on the M energy smoothing ratios, the obtained M second energy smoothing ratios are more stable relative to the M first energy smoothing ratios, thereby reducing influence of individual abnormal ratio in the M first energy smoothing ratios on the accuracy of state detection. As an example, smoothing parameters of the first smoothing processing and smoothing parameters of the second smoothing processing are different.

Step S103: performing double-talk state detection based on the M first energy smoothing ratios and the M second energy smoothing ratios to determine a state of the input signal.

In this embodiment, the M first energy smoothing ratios and the M second energy smoothing ratios are used as the basis for double-talk state detection, thereby improving the accuracy of state detection.

In the double-talk state detection method according to one embodiment of the present application, the first smoothing processing is performed on the energy ratio between the first energy of the error signal in each sub-band of M sub-bands and the second energy of the filtered signal in the same sub-band as the error signal, and the obtained M first energy smoothing ratios are more stable, thereby reducing influence of abnormal energy ratio in the M energy ratios caused by abnormality of the error signal in one sub-band, on accuracy of state detection. Further, the second smoothing processing is performed on the M first energy smoothing ratios which are obtained after the first smoothing processing, and the obtained M second energy smoothing ratios are more stable, thereby reducing influence of individual abnormal ratio in the M first energy smoothing ratios on the accuracy of state detection. Therefore, performing double-talk state detection based on the M first energy smoothing ratios and the M second energy smoothing ratios can improve the accuracy of state detection.

In one embodiment, performing a first smoothing processing on the M energy ratios to obtain M first energy smoothing ratios, and performing a second smoothing processing on the M first energy smoothing ratios to obtain M second energy smoothing ratios, includes: when a signal-to-noise ratio of the reference signal is greater than a preset signal-to-noise ratio, performing the first smoothing processing on the M energy ratios to obtain the M first energy smoothing ratios, and performing the second smoothing processing on the M first energy smoothing ratios to obtain the M second energy smoothing ratios.

That is, after obtaining the reference signal, the signal-to-noise ratio of the reference signal may be calculated first, for example, the noise of the reference signal may be estimated (for example, the minimum tracking method may be used to estimate the noise). That is, the noise of the reference signal may be tracked to obtain the noise of the reference signal, and then a ratio of the reference signal to the noise of the reference signal is calculated to obtain the signal-to-noise ratio of the reference signal. In order to reduce situations that the presence of noise will make the energy ratio larger and reduces the accuracy of state detection when the signal-to-noise ratio of the reference signal is low, in the smoothing processing of this embodiment, the signal-to-noise ratio of the reference signal is first compared with the preset signal-to-noise ratio, and when the signal-to-noise ratio of the reference signal is greater than the preset signal-to-noise ratio, the first smoothing processing is performed on the M energy ratios to obtain the M first energy smoothing ratios. In case that the reference signal is relatively strong (i.e., the signal-to-noise ratio of the reference signal is relatively strong), in order to avoid subsequent tracking of particularly small noise, it is further necessary to perform the second smoothing processing on the M first energy smoothing ratios to obtain the M second energy smoothing ratios, thereby improving the accuracy of state detection.

As an example, after determining the state of the input signal, the method may further include: adjusting filtering parameters of the linear filter according to the state of the input signal.

The linear filter is a filter that filters the reference signal to obtain the filtered signal. For example, if the state of the input signal is the double-talk state, the filtering parameters of the linear filter remain unchanged. If the state of the input signal is the single-talk state, the filtering parameters of the linear filter are updated. There are many ways to update the filtering parameters of the linear filter, which are not limited in the present application.

Figure 2:
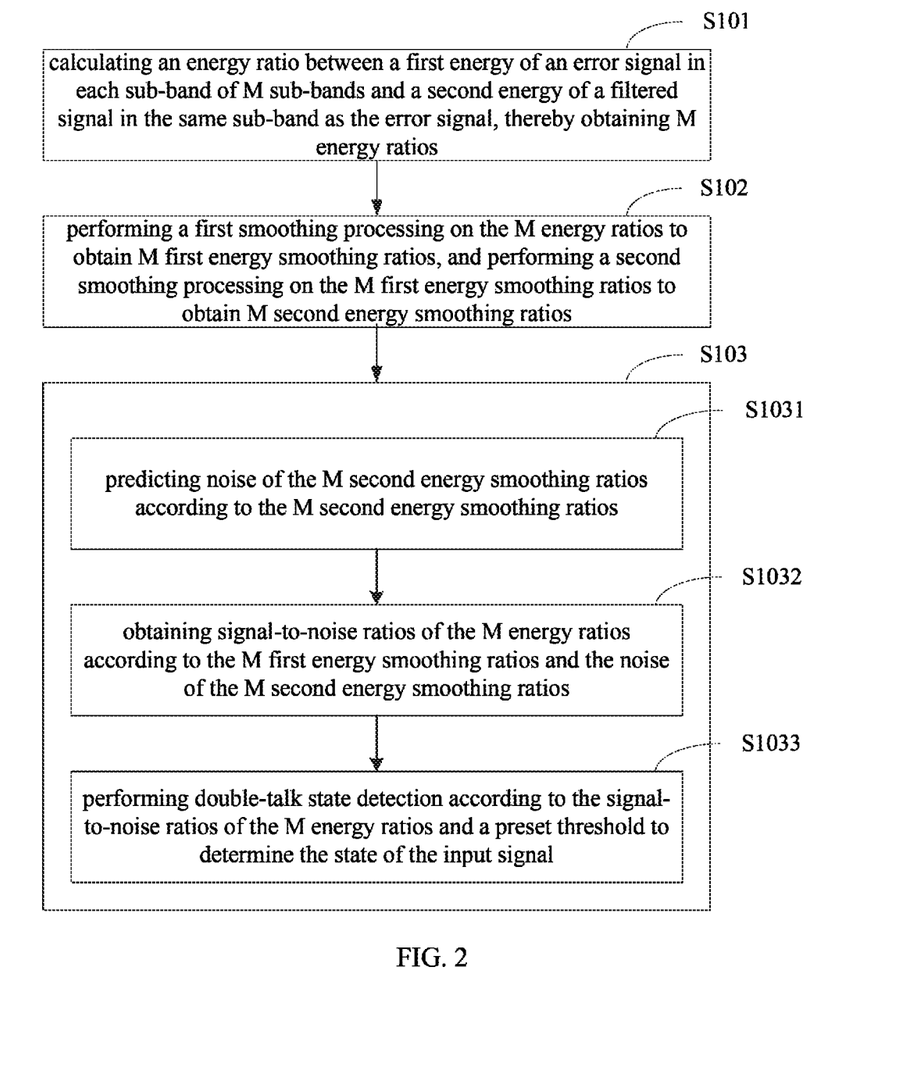
FIG. 2 is a second schematic flowchart of a double-talk state detection method according to an embodiment of the present application.

As shown in FIG. 2, in one embodiment, the step S103 of performing double-talk state detection based on the M first energy smoothing ratios and the M second energy smoothing ratios to determine a state of the input signal, includes the following steps.

Step S1031: predicting noise of the M second energy smoothing ratios according to the M second energy smoothing ratios.

The M second energy smoothing ratios are a result of performing the second smoothing processing on the M first energy smoothing ratios. Thus, performing noise prediction according to the M second energy smoothing ratios obtained after the second smoothing processing, can improve accuracy of noise prediction, thereby improving the accuracy of state detection.

It should be noted that there are many ways to predict the noise of the M second energy smoothing ratios. As an example, the minimum tracking algorithm may be used to predict the noise of the M second energy smoothing ratios. That is, the minimum tracking algorithm is used to track a minimum value of the second energy smoothing ratios, predict a minimum value of the second energy smoothing ratios, and take it as the noise of the second energy smoothing ratios.

Step S1032: obtaining signal-to-noise ratios of the M energy ratios according to the M first energy smoothing ratios and the noise of the M second energy smoothing ratios.

The first energy smoothing ratios are a result of performing the first smoothing processing on the energy ratios. The first energy smoothing ratios are corresponding to the energy ratios in a one-to-one manner. The second energy smoothing ratios are a result of performing the second smoothing processing on the first energy smoothing ratios, and the second energy smoothing ratios are corresponding to the first energy smoothing ratios in a one-to-one manner. A ratio between each first energy smoothing ratio and its corresponding second energy smoothing ratio may be taken as a signal-to-noise ratio of the corresponding energy ratio. In this way, signal-to-noise ratios of the M energy ratios.

Step S1033: performing double-talk state detection according to the signal-to-noise ratios of the M energy ratios and a preset threshold to determine the state of the input signal.

After obtaining the signal-to-noise ratios of the M energy ratios, the double-talk state detection can be performed according to the signal-to-noise ratios of the M energy ratios and the preset threshold, thereby determining the state of the input signal.

In this embodiment, the M first energy smoothing ratios and the predicted noise of the M second energy smoothing ratios are used to calculate the signal-to-noise ratios of the energy ratios, and the signal-to-noise ratios of the energy ratios are used for double-talk state detection, thereby improving detection accuracy.

In one embodiment, before calculating an energy ratio between a first energy of an error signal in each sub-band of M sub-bands and a second energy of a filtered signal in the same sub-band as the error signal, the method further includes: obtaining the reference signal and the input signal collected by the microphone; performing filtering processing on the reference signal to obtain the filtered signal; obtaining the error signal between the input signal and the filtered signal; calculating M first energies of the error signal in the M sub-bands and M second energies of the filtered signal in the M sub-bands.

That is, before calculating the energy ratios, it is necessary to obtain energies. Since there are M sub-bands, it is necessary to calculate the first energy of the error signal in each sub-band of the M sub-bands and calculate the second energy of the filtered signal in each sub-band of the M sub-bands. As a result, M first energies and M second energies are obtained and provide the basis for subsequent calculation of the energy ratios.

In one embodiment, the filtered signal includes N frame filtered sub-signals, and the error signal includes N frame error sub-signals, where N is a positive integer.

An energy ratio in a target sub-band includes N sub-energy ratios in the target sub-band. The N sub-energy ratios in the target sub-band include an energy ratio of a first energy of each frame error sub-signal in the target sub-band and a second energy of a corresponding frame filtered sub-signal in the target sub-band. The first energy smoothing ratio in the target sub-band includes N first sub-energy smoothing ratios obtained after performing the first smoothing processing on the N sub-energy ratios. The second energy smoothing ratio in the target sub-band includes N second sub-energy smoothing ratios obtained after performing the second smoothing processing on the N first sub-energy smoothing ratios. The target sub-band is any sub-band of the M sub-bands.

It can be understood that the input signal includes N frame input sub-signals, the reference signal includes N frame reference sub-signals, and the error signal is determined according to the input signal and the reference signal, and thus an error sub-signal is determined according to the input sub-signal and the reference sub-signal. The input sub-signals are corresponding to the error sub-signals in a one-to-one manner. The reference sub-signals are corresponding to the error sub-signals in a one-to-one manner. The filtered signal is determined by the reference signal, thus a filtered sub-signal is determined by the reference sub-signal, and the filtered sub-signals are corresponding to the reference sub-signals in a one-to-one manner. In this way, the error sub-signals are corresponding to the filtered sub-signals in a one-to-one manner. Each frame error sub-signal in the target sub-band has its corresponding first energy. Each frame filter sub-signal in the target sub-band has its corresponding second energy. By calculating an energy ratio of the first energy of each frame error sub-signal in the N frame error sub-signals in the target sub-band to the second energy of the corresponding frame filter sub-signal in the target sub-band, N sub-energy ratios can be obtained.

In this embodiment, framing processing is performed on the error signal and the filtered signal. By calculating an energy ratio of the first energy of each frame error sub-signal in the N frame error sub-signals in the target sub-band to the second energy of the corresponding frame filter sub-signal in the target sub-band, N sub-energy ratios in the target sub-band can be obtained. The energy ratio in the target sub-band includes the N sub-energy ratios in the target sub-band. Since there are M sub-bands, N sub-energy ratios in each sub-band of the M sub-bands can be obtained. The N sub-energy ratios in each sub-band of the M sub-bands are used as the basis of double-talk state detection, thereby improving the accuracy of state detection.

In one embodiment, the first smoothing processing is performed on the M energy ratios with the following formula:

$$\text{ratio\_short\_sm}(n+1,k) = \alpha * \text{ratio\_short\_sm}(n,k) + (1-\alpha) * \text{ratio}(n+1,k)$$

Where $\alpha$ is a first smoothing factor; ratio(n+1,k) is a sub-energy ratio of a first energy of a (n+1)-th frame error sub-signal in a k-th sub-band to a second energy of a (n+1)-th frame filtered sub-signal in the k-th sub-band; ratio_short_sm(n+1,k) is a first sub-energy smoothing ratio obtained after performing a first smoothing processing performed on the ratio(n+1,k); ratio_short_sm(n,k) is a first sub-energy smoothing ratio obtained after performing a first smoothing processing on ratio(n,k); ratio(n,k) is a sub-energy ratio of a first energy of an n-th frame error sub-signal in the k-th sub-band to a second energy of an n-th frame filtered sub-signal in the k-th sub-band; n is a positive integer, and n≤N−1; k is a positive integer, and k≤M, ratio_short_sm(1,k) is equal to ratio(1,k), ratio(1,k) is a sub-energy ratio of a first energy of a first frame error sub-signal in the k-th sub-band to a second energy of a first frame filtered sub-signal in the k-th sub-band.

Frame orders of the error sub-signals are time sequences of the error sub-signals in the error signal. Frame orders of the filter sub-signals are time sequences of the filtered sub-signals in the filtered signal. ratio_short_sm(1,k) equal to ratio(1,k) may be understood as that for a sub-energy ratio of a first energy of an earliest first frame error sub-signal in the k-th sub-band to a second energy of a first frame filtered sub-signal in the k-th sub-band, a result obtained after performing a first smoothing is the same as a result before performing the smoothing. In other words, the sub-energy ratio of the first energy of the first frame error sub-signal collected first in the k-th sub-band to the second energy of the first frame filtered sub-signal in the k-th sub-band, is not smoothed. Through the foregoing first smoothing processing, the obtained M first energy smoothing ratios are more stable relative to the M energy ratios, and the double-talk state detection is performed accordingly to improve the detection accuracy.

As an example, $0 \leq \alpha \leq 1$. In the foregoing first smoothing processing formula, a value of the first smoothing factor $\alpha$ may be determined according to ratio_short_sm(n,k) and ratio(n+1,k) on the right side of the formula. As n or/and k changes, ratio_short_sm(n,k) and ratio(n+1,k) change accordingly, then $\alpha$ may change. For example, after performing a first smoothing processing on ratio(n,k), ratio_short_sm(n,k) is obtained. If a first smoothing processing is currently required to be performed on ratio(n+1,k), when ratio_short_sm(n,k) is less than ratio(n+1,k), it means that a current possibility of existence of near-end voice is relatively high and it needs to track the current ratio(n+1,k) as soon as possible, and thus the first smoothing factor chooses a relatively small value; otherwise, the first smoothing factor chooses a larger value. For example, a first preset value and a second preset value are set in advance, and the first preset value is smaller than the second preset value. As an example, the first preset value may be 0.5, and the second preset value may be 0.7. In the case that ratio_short_sm(n,k) is less than ratio(n+1,k), the first preset value may be selected as the value of the first smoothing factor, otherwise the second preset value is selected as the value of the first smoothing factor.

In one embodiment, the second smoothing processing is performed on the M energy smoothing ratios with the following formula:

$$\text{ratio\_long\_sm}(n+1,k) = \beta * \text{ratio\_long\_sm}(n,k) + (1-\beta) * \text{ratio\_short\_sm}(n+1,k)$$

Where $\beta$ is a second smoothing factor, ratio_long_sm(n+1,k) is a second sub-energy smoothing ratio obtained after performing a second smoothing processing on ratio_short_sm(n+1,k); ratio_short_sm(n+1,k) is a first sub-energy smoothing ratio obtained after performing a first smoothing processing on ratio(n+1,k); ratio(n+1,k) is a sub-energy ratio of a first energy of a (n+1)-th frame error sub-signal in a k-th sub-band to a second energy of a (n+1)-th frame filtered sub-signal in the k-th sub-band; ratio_long_sm(n,k) is a first sub-energy smoothing ratio obtained after performing a second smoothing processing on the ratio_short_sm(n,k); ratio_short_sm(n,k) is a first sub-energy smoothing ratio obtained after performing a first smoothing processing on ratio(n,k); ratio(n,k) is a sub-energy ratio of a first energy of an n-th frame error sub-signal in the k-th sub-band to a second energy of an n-th frame filtered sub-signal in the k-th sub-band; n is a positive integer, and n≤N−1; k is a positive integer, and k≤M, ratio_long_sm(1,k) is equal to ratio_short_sm(1,k).

Frame orders of the error sub-signals are time sequences of the error sub-signals in the error signal. Frame orders of the filter sub-signals are time sequences of the filtered sub-signals in the filtered signal. ratio_long_sm(1,k) equal to ratio_short_sm(1,k) may be understood as that for a sub-energy ratio of a first energy of an earliest first frame error sub-signal in the k-th sub-band to a second energy of a first frame filtered sub-signal in the k-th sub-band, a result obtained after performing a first smoothing processing is the same as a result obtained after performing a second smoothing processing. In other words, after performing a first smoothing processing on the sub-energy ratio of the first energy of the first frame error sub-signal collected first in the k-th sub-band to the second energy of the first frame filtered sub-signal in the k-th sub-band, a second smoothing processing is not smoothed. Through the foregoing second smoothing processing, the obtained M second energy smoothing ratios are more stable relative to the M first energy smoothing ratios, and the double-talk state detection is performed accordingly to improve the detection accuracy. As an example, $0 \leq \beta \leq 1$, for example, $\beta$ may be 0.99. In addition, $\beta > \alpha$.

In one embodiment, the performing double-talk state detection according to the signal-to-noise ratios of the M energy ratios and a preset threshold to determine the state of the input signal, includes:

calculating a total sum of signal-to-noise ratios of I energy ratios in the signal-to-noise ratios of the M energy ratios, where I is a positive integer, and I≤M;

in case that the total sum is greater than the preset threshold, determining that the input signal is in the double-talk state, or, in case that the total sum is less than or equal to the preset threshold, determining that the input signal is in the single-talk state.

The energy ratios are corresponding to the sub-bands in a one-to-one manner. The sub-band is corresponding to a sub-frequency range. As an example, the forgoing I energy ratios may be energy ratios with corresponding sub-bands of sub-frequency ranges in a first frequency range, in the M energy ratios. For example, if a preset frequency band is 3000 Hz and divided into M sub-bands, since an energy of a near-end voice signal is mainly in a low frequency band (below 2000 Hz), the first frequency range may be 0-2000 Hz. Alternatively, the first frequency range may be selected according to a frequency distribution of the input signal received by the microphone of the electronic device. For example, a frequency band with a large signal-to-noise ratio (for example, greater than a preset threshold) in the input signal collected by the microphone is selected as the first frequency range. In this embodiment, the double-talk state detection is performed according to a sum of signal-to-noise ratios of energy ratios (i.e., I energy ratios) with corresponding sub-bands of sub-frequency ranges in the first frequency range, in the M energy ratios. In this way, not only an amount of calculation can be reduced but also the detection accuracy can be improved.

In one embodiment, the input signal includes N frame input sub-signals, and the input sub-signals are corresponding to the error signals in a one-to-one manner. For the case of framing processing, the foregoing total sum may include a sum of signal-to-noise ratios of I energy ratios in the signal-to-noise ratios of the M energy ratios in each frame error sub-signal (or each frame filtered sub-signal), that is, the total sum includes N sums of signal-to-noise ratios. In this way, in case that the total sum is greater than the preset threshold, determining that the input signal is in the double-talk state, includes: determining that a first target frame input sub-signal (belonging to the input sub-signals of the input signal) corresponding to a first target signal-to-noise ratio which is greater than a preset threshold in the N sums of signal-to-noise ratios, is in the double-talk state; and determining that a second target frame input sub-signal (belonging to the input sub-signals of the input signal) corresponding to a second target signal-to-noise ratio which is less than or equal to the preset threshold in the N sums of signal-to-noise ratios, is in the single-talk state.

The process of the foregoing double-talk state detection method is described in detail with a specific embodiment below.

Figure 3:
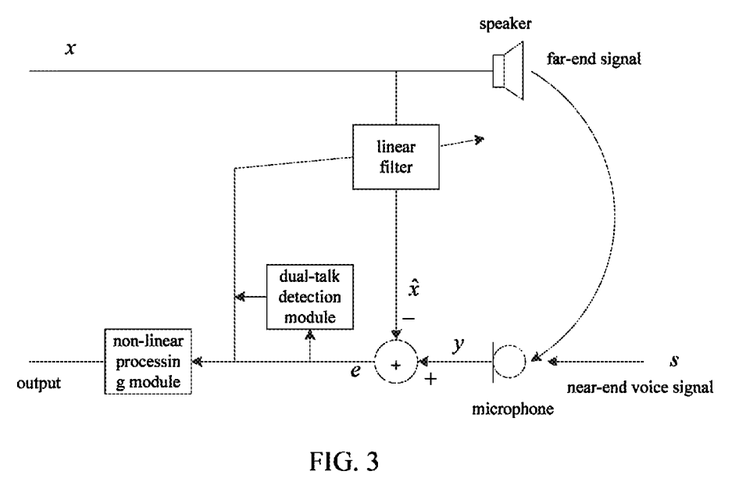
FIG. 3 is a circuit diagram of an AEC algorithm according to an embodiment of the present application.

As shown in FIG. 3, a circuit diagram of an AEC algorithm is shown. In the AEC algorithm, in order to better eliminate a far-end signal and protect a near-end voice signal s, a double-talk detection module is usually provided. The double-talk detection module is used to detect a state of an input signal y: a near-end state, a single-talk state or a double-talk state. The near-end state means that there is only near-end voice signal of a near-end speaker. The single-talk state means that there is only far-end signal. The double-talk state means that there are both a near-end voice signal of a near-end speaker and a far-end signal. Only after distinguishing the state of the input signal, different processing can be performed for different states in the subsequent processing. For example, in the near-end state, there is no need to perform acoustic echo cancellation; the level of acoustic echo cancellation is lower in the double-talk state, and the level of acoustic echo cancellation is higher in the single-talk state, and thus echo is eliminated as much as possible when there is only far-end signal, and distortion of voice signals is reduced when there is a near-end signal.

As shown in FIG. 3, the circuit diagram that implements the AEC algorithm includes a linear filter, a double-talk detection module, and a non-linear processing module. In addition, a first sub-band transformation module is connected between the microphone and a differential circuit, and is used to perform sub-band decomposition on the input signal. Furthermore, a second sub-band transformation module is connected between a reference signal x and the linear filter, and is used to perform sub-band decomposition on the reference signal. After the linear filter performs linearly filtering on the reference signal, the differential circuit performs a differential processing on an input signal y of the microphone and the filtered signal x to obtain an error signal e. Most of far-end signal in the input signal received by the microphone has been eliminated, while a near-end voice signal is retained, and the non-linear processing module performs further echo cancellation on the error signal e. At this point, an energy ratio ratio(n,k) between the error signal and the filtered signal in each sub-band is calculated.

$$\text{ratio}(n, k) = \frac{|E(n, k)|^2}{|X(n, k)|^2},$$

where $E(n,k)$ is a frequency domain signal of an n-th frame error sub-signal of the error signal in a k-th sub-band, $|E(n,k)|^2$ is a first energy of the n-th frame error sub-signal of the error signal in the k-th sub-band, $X(n,k)$ is a frequency domain signal of an n-th frame filtered sub-signal of the filtered signal in the k-th sub-band, $|X(n,k)|^2$ is a second energy of the n-th frame filtered sub-signal of the filtered signal in the k-th sub-band.

When there is a near-end voice signal, ratio(n,k) is larger, and when there is only a far-end signal, ratio(n,k) is smaller. If ratio(n,k) is directly used for state judgment, a judgment threshold is difficult to be unified under the condition of different reference signal energies, and abnormal points in individual sub-bands easily affect a final judgment result.

When the signal-to-noise ratio of the reference signal is large, short-term smoothing (i.e., the first smoothing processing) and long-term smoothing (i.e., the second smoothing processing) are performed on ratio(n,k). The requirement that the signal-to-noise ratio of the reference signal is large is to prevent that when the signal-to-noise ratio of the reference signal is low, the presence of the noise signal will make ratio(n,k) too large, which affects the judgment result.

In this embodiment, the process of the forgoing double-talk state detection method is as follows:

calculating M first energies of the error signal in the M sub-bands and M second energies of the filtered signal in the M sub-bands;

calculating a sub-energy ratio ratio(n,k), where n is 1, 2, . . . , N−1, and k is 1, 2, . . . , M;

performing short-term smoothing on ratio(n,k) to obtain ratio_short_sm(n,k);

performing long-term smoothing on ratio_short_sm(n,k) to obtain ratio_long_sm(n,k);

tracking noise ratio_long_min(n,k) of ratio_short_sm(n,k) through a minimum tracking algorithm;

calculating a signal-to-noise ratio ratio_snr(n,k) of ratio(n,k), where $$\text{ratio\_snr}(n, k) = \frac{\text{ratio\_short\_sm}(n, k)}{\text{ratio\_long\_min}(n, k)}$$

summing ratio_snr(n,k) of sub-bands with sub-frequency ranges in a first preset frequency range, i.e., $$\text{RATIO\_SNR} = \sum_{k=k_1}^{k_2} \text{ratio\_snr}(n, k)$$

where sub-frequency ranges corresponding to k1 and k2 are within the first preset frequency range, k1 is a positive integer, k1≤M, k2 is a positive integer, k2≤M, k1≤k2; RATIO_SNR is a sum of signal-to-noise ratios of (k2−k1+1) energy ratios in the n-th frame error signal, or is a sum of signal-to-noise ratios of (k2−k1+1) energy ratios in the n-th frame input sub-signal, i.e., I is equal to (k2−k1+1);

comparing RATIO_SNR with a judgement threshold (i.e., the preset threshold) T, if RATIO_SNR>T, determining that it is a double-talk state, otherwise, it is a single-talk state.

Since the final comparison with the judgement threshold is the signal-to-noise ratio of the energy ratio of the error signal to the filtered signal (corresponding to the reference signal), adaptive adjustment of the double-talk state detection can be realized. Regardless of sizes of energies of the error signal and the filtered signal, the signal-to-noise ratio can be maintained at a certain level, that is, the signal-to-noise ratio is high when the near-end voice exists, and otherwise the signal-to-noise ratio is low. Meanwhile, selecting a low frequency band (or selecting other frequency bands according to actual equipment) can also avoid the influence of abnormal points of individual frequency, so that the double-talk detection accuracy is higher.

Figure 4:
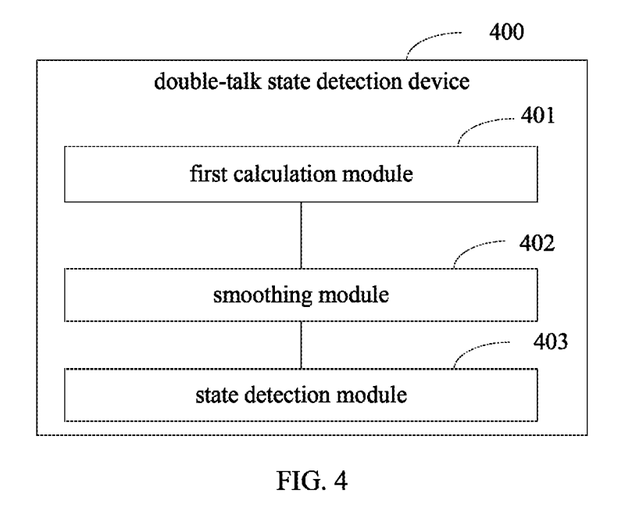
FIG. 4 is a structural diagram of a double-talk state detection device according to an embodiment of the present application.

Referring to FIG. 4, one embodiment of the present application provides an a double-talk state detection device 400, including:

a first calculation module 401 configured to calculate an energy ratio between a first energy of an error signal in each sub-band of M sub-bands and a second energy of a filtered signal in the same sub-band as the error signal, thereby obtaining M energy ratios; where the error signal is a difference between an input signal collected by a microphone and the filtered signal, the filtered signal is a signal obtained after performing filtering process on a reference signal, and M is a positive integer;

a smoothing module 402 configured to perform a first smoothing processing on the M energy ratios to obtain M first energy smoothing ratios, and perform a second smoothing processing on the M first energy smoothing ratios to obtain M second energy smoothing ratios;

a state detection module 403 configured to perform double-talk state detection based on the M first energy smoothing ratios and the M second energy smoothing ratios to determine a state of the input signal.

In one embodiment, the state detection module includes:

a noise prediction module configured to predict noise of the M second energy smoothing ratios according to the M second energy smoothing ratios;

a signal-to-noise ratio obtaining module configured to obtain signal-to-noise ratios of the M energy ratios according to the M first energy smoothing ratios and the noise of the M second energy smoothing ratios;

a state determination module configured to perform double-talk state detection according to the signal-to-noise ratios of the M energy ratios and a preset threshold to determine the state of the input signal.

In one embodiment, the filtered signal includes N frame filtered sub-signals, and the error signal includes N frame error sub-signals, where N is a positive integer.

An energy ratio in a target sub-band includes N sub-energy ratios in the target sub-band. The N sub-energy ratios in the target sub-band include an energy ratio of a first energy of each frame error sub-signal in the target sub-band and a second energy of a corresponding frame filtered sub-signal in the target sub-band. The first energy smoothing ratio in the target sub-band includes N first sub-energy smoothing ratios obtained after performing the first smoothing processing on the N sub-energy ratios. The second energy smoothing ratio in the target sub-band includes N second sub-energy smoothing ratios obtained after performing the second smoothing processing on the N first sub-energy smoothing ratios. The target sub-band is any sub-band of the M sub-bands.

In one embodiment, the smoothing module performs the first smoothing processing on the M energy ratios with the following formula:

$$\text{ratio\_short\_sm}(n+1,k)=\alpha*\text{ratio\_short\_sm}(n,k)+(1-\alpha)*\text{ratio}(n+1,k)$$

Where α is a first smoothing factor; ratio(n+1,k) is a sub-energy ratio of a first energy of a (n+1)-th frame error sub-signal in a k-th sub-band to a second energy of a (n+1)-th frame filtered sub-signal in the k-th sub-band; ratio_short_sm(n+1,k) is a first sub-energy smoothing ratio obtained after performing a first smoothing processing performed on the ratio(n+1,k); ratio_short_sm(n,k) is a first sub-energy smoothing ratio obtained after performing a first smoothing processing on ratio(n,k); ratio(n,k) is a sub-energy ratio of a first energy of an n-th frame error sub-signal in the k-th sub-band to a second energy of an n-th frame filtered sub-signal in the k-th sub-band; n is a positive integer, and n≤N−1; k is a positive integer, and k≤M, ratio_short_sm(1,k) is equal to ratio(1,k), ratio(1,k) is a sub-energy ratio of a first energy of a first frame error sub-signal in the k-th sub-band to a second energy of a first frame filtered sub-signal in the k-th sub-band.

In one embodiment, the smoothing module performs the second smoothing processing on the M energy smoothing ratios with the following formula:

$$\text{ratio\_long\_sm}(n+1,k)=\beta*\text{ratio\_long\_sm}(n,k)+(1-\beta)*\text{ratio\_short\_sm}(n+1,k)$$

Where β is a second smoothing factor, ratio_long_sm(n+1,k) is a second sub-energy smoothing ratio obtained after performing a second smoothing processing on ratio_short_sm(n+1,k); ratio_short_sm(n+1,k) is a first sub-energy smoothing ratio obtained after performing a first smoothing processing on ratio(n+1,k); ratio(n+1,k) is a sub-energy ratio of a first energy of a (n+1)-th frame error sub-signal in a k-th sub-band to a second energy of a (n+1)-th frame filtered sub-signal in the k-th sub-band; ratio_long_sm(n,k) is a first sub-energy smoothing ratio obtained after performing a second smoothing processing on the ratio_short_sm(n,k); ratio_short_sm(n,k) is a first sub-energy smoothing ratio obtained after performing a first smoothing processing on ratio(n,k); ratio(n,k) is a sub-energy ratio of a first energy of an n-th frame error sub-signal in the k-th sub-band to a second energy of an n-th frame filtered sub-signal in the k-th sub-band; n is a positive integer, and n≤N−1; k is a positive integer, and k≤M, ratio_long_sm(1,k) is equal to ratio_short_sm(1,k).

In one embodiment, the state determination module for determining the state of the input signal, includes:

a sum module configured to calculate a total sum of signal-to-noise ratios of I energy ratios in the signal-to-noise ratios of the M energy ratios, where I is a positive integer, and in case that the total sum is greater than the preset threshold, determine that the input signal is in the double-talk state, or, in case that the total sum is less than or equal to the preset threshold, determine that the input signal is in the single-talk state.

The double-talk state detection devices of the foregoing embodiments are devices that implement the double-talk state detection methods of the foregoing embodiments, and have corresponding technical features and corresponding technical effects, which will not be repeated here.

According to the embodiments of the present application, the present application further provides an electronic device and a readable storage medium.

Figure 5:
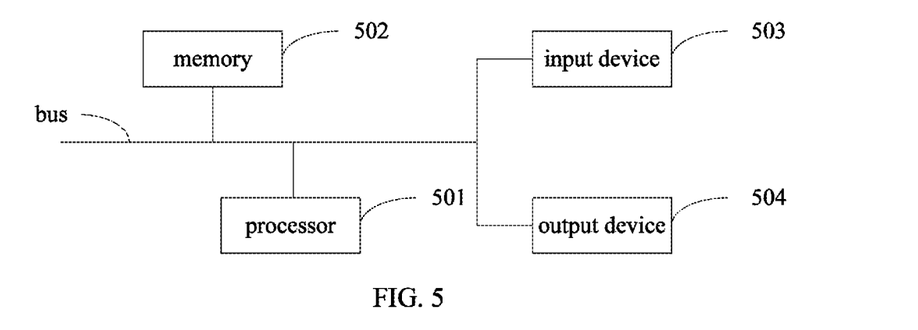
FIG. 5 is a block diagram of an electronic device for implementing a double-talk state detection method according to an embodiment of the present application.

FIG. 5 is a block diagram of an electronic device of the double-talk state detection method according to an embodiment of the present application. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital processing, cellular telephones, smart phones, wearable devices, and other similar computing devices. The components shown herein, their connections and relationships, and their functions are by way of example only and are not intended to limit the implementations of the present application described and/or claimed herein.

As shown in FIG. 5, the electronic device includes: one or more processors 501, a memory 502, and interfaces for connecting various components, including high-speed interfaces and low-speed interfaces. The various components are interconnected using different buses and may be mounted on a common motherboard or otherwise as desired. The processor may process instructions for execution within the electronic device, including instructions stored in the memory or on the memory to display graphical information of a Graphical User Interface (GUI) on an external input/output device, such as a display device coupled to the interface. In other embodiments, multiple processors and/or multiple buses and multiple memories may be used with multiple memories if desired. Similarly, multiple electronic devices may be connected, each providing part of the necessary operations (e.g., as an array of servers, a set of blade servers, or a multiprocessor system). In FIG. 5, one processor 501 is taken as an example.

The memory 502 is a non-transitory computer-readable storage medium provided herein. The memory stores instructions executable by at least one processor to enable the at least one processor to implement the double-talk state detection method provided herein. The non-transitory computer-readable storage medium of the present application stores computer instructions for enabling a computer to implement the double-talk state detection method provided herein.

The memory 502, as a non-transitory computer-readable storage medium, may be used to store non-transitory software programs, non-transitory computer-executable programs, and modules, such as program instructions/modules (e.g., the first calculation module 401, the smoothing module 402 and the state detection module 403 shown in FIG. 14) corresponding to the double-talk state detection method of embodiments of the present application. The processor 501 executes various functional applications of the server and data processing, i.e., a double-talk state detection method in the above-mentioned method embodiment, by operating non-transitory software programs, instructions, and modules stored in the memory 502.

The memory 502 may include a program storage area and a data storage area, wherein the program storage area may store an application program required by an operating system and at least one function; the data storage area may store data created according to the use of the electronic device of the double-talk state detection method, etc. In addition, the memory 502 may include a high speed random access memory, and may also include a non-transitory memory, such as at least one magnetic disk storage device, a flash memory device, or other non-transitory solid state memory device. In some embodiments, the memory 502 may optionally include memories remotely located with respect to processor 501, which may be connected via a network to the electronic device. Examples of such networks include, but are not limited to, the Internet, intranet, local area networks, mobile communication networks, and combinations thereof.

The electronic device of the double-talk state detection method may further include: an input device 503 and an output device 504. The processor 501, the memory 502, the input device 503, and the output device 504 may be connected via a bus or otherwise. FIG. 5 takes a bus connection as an example.

The input device 503 may receive input numeric or character information and generate key signal inputs related to user settings and functional controls of the electronic device, such as input devices including touch screens, keypads, mice, track pads, touch pads, pointing sticks, one or more mouse buttons, trackballs, joysticks, etc. The output device 504 may include display devices, auxiliary lighting devices (e.g., LEDs), tactile feedback devices (e.g., vibration motors), and the like. The display device may include, but is not limited to, a Liquid Crystal Display (LCD), a Light Emitting Diode (LED) display, and a plasma display. In some embodiments, the display device may be a touch screen.

Various embodiments of the systems and techniques described herein may be implemented in digital electronic circuit systems, integrated circuit systems, Application Specific Integrated Circuits (ASICs), computer hardware, firmware, software, and/or combinations thereof. These various embodiments may include: implementation in one or more computer programs which can be executed and/or interpreted on a programmable system including at least one programmable processor, and the programmable processor may be a dedicated or general-purpose programmable processor which can receive data and instructions from, and transmit data and instructions to, a memory system, at least one input device, and at least one output device.

These computing programs (also referred to as programs, software, software applications, or codes) include machine instructions of a programmable processor, and may be implemented using high-level procedural and/or object-oriented programming languages, and/or assembly/machine languages. As used herein, the terms "machine-readable medium" and "computer-readable medium" refer to any computer program product, device, and/or apparatus (e.g., magnetic disk, optical disk, memory, programmable logic device (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide for interaction with a user, the systems and techniques described herein may be implemented on a computer having: a display device (e.g., a Cathode Ray Tube (CRT) or Liquid Crystal Display (LCD) monitor) for displaying information to a user; and a keyboard and a pointing device (e.g., a mouse or a trackball) by which a user can provide input to the computer. Other types of devices may also be used to provide interaction with a user; for example, the feedback provided to the user may be any form of sensory feedback (e.g., visual feedback, audile feedback, or tactile feedback); and input from the user may be received in any form, including acoustic input, audio input, or tactile input.

The systems and techniques described herein may be implemented in a computing system that includes a background component (e.g., as a data server), or a computing system that includes a middleware component (e.g., an application server), or a computing system that includes a front-end component (e.g., a user computer having a graphical user interface or a web browser through which a user may interact with embodiments of the systems and techniques described herein), or in a computing system that includes any combination of such background component, middleware component, or front-end component. The components of the system may be interconnected by digital data communication (e.g., a communication network) of any form or medium. Examples of the communication network include: Local Area Networks (LANs), Wide Area Networks (WANs), and the Internet.

The computer system may include a client and a server. The client and the server are typically remote from each other and typically interact through a communication network. A relationship between the client and the server is generated by computer programs operating on respective computers and having a client-server relationship with each other.

According to the technical solution of the embodiment of the application, in the double-talk state detection method according to one embodiment of the present application, the first smoothing processing is performed on the energy ratio between the first energy of the error signal in each sub-band of M sub-bands and the second energy of the filtered signal in the same sub-band as the error signal, and the obtained M first energy smoothing ratios are more stable, thereby reducing influence of abnormal energy ratio in the M energy ratios caused by abnormality of the error signal in one sub-band, on accuracy of state detection. Further, the second smoothing processing is performed on the M first energy smoothing ratios which are obtained after the first smoothing processing, and the obtained M second energy smoothing ratios are more stable, thereby reducing influence of individual abnormal ratio in the M first energy smoothing ratios on the accuracy of state detection. Therefore, performing double-talk state detection based on the M first energy smoothing ratios and the M second energy smoothing ratios can improve the accuracy of state detection.

It will be appreciated that the various forms of flow, reordering, adding or removing steps shown above may be used. For example, the steps recited in the present application may be performed in parallel or sequentially or may be performed in a different order, so long as the desired results of the technical solutions disclosed in the present application can be achieved, and no limitation is made herein.

The above-mentioned embodiments are not to be construed as limiting the scope of the present application. It will be apparent to a person skilled in the art that various modifications, combinations, sub-combinations and substitutions are possible, depending on design requirements and other factors. Any modifications, equivalents, and improvements within the spirit and principles of this application are intended to be included within the scope of the present application.

What is claimed is:

1. A double-talk state detection method, comprising:
calculating an energy ratio between a first energy of an error signal in each sub-band of M sub-bands and a second energy of a filtered signal in the same sub-band as the error signal, thereby obtaining M energy ratios; wherein the error signal is a difference between an input signal collected by a microphone and the filtered signal, the filtered signal is a signal obtained after performing filtering process on a reference signal, and M is a positive integer;
performing a first smoothing processing on the M energy ratios to obtain M first energy smoothing ratios, and performing a second smoothing processing on the M first energy smoothing ratios to obtain M second energy smoothing ratios;
performing double-talk state detection based on the M first energy smoothing ratios and the M second energy smoothing ratios to determine a state of the input signal;
wherein the performing double-talk state detection based on the M first energy smoothing ratios and the M second energy smoothing ratios to determine a state of the input signal, comprises:
predicting noise of the M second energy smoothing ratios according to the M second energy smoothing ratios;
obtaining signal-to-noise ratios of the M energy ratios according to the M first energy smoothing ratios and the noise of the M second energy smoothing ratios;
performing double-talk state detection according to the signal-to-noise ratios of the M energy ratios and a preset threshold to determine the state of the input signal.

2. The method according to claim 1, wherein the filtered signal comprises N frame filtered sub-signals, and the error signal comprises N frame error sub-signals, where N is a positive integer;
an energy ratio in a target sub-band comprises N sub-energy ratios in the target sub-band; the N sub-energy ratios in the target sub-band comprises an energy ratio between a first energy of each frame error sub-signal in the target sub-band and a second energy of a corresponding frame filtered sub-signal in the target sub-band; a first energy smoothing ratio in the target sub-band comprises N first sub-energy smoothing ratios obtained after performing a first smoothing processing on the N sub-energy ratios; a second energy smoothing ratio in the target sub-band comprises N second sub-energy smoothing ratios obtained after performing a second smoothing processing on the N first sub-energy smoothing ratios; the target sub-band is any sub-band of the M sub-bands.

3. The method according to claim 2, wherein the first smoothing processing is performed on the M energy ratios with the following formula:

$$\text{ratio\_short\_sm}(n+1,k) = \alpha * \text{ratio\_short\_sm}(n,k) + (1-\alpha) * \text{ratio}(n+1,k)$$

wherein $\alpha$ is a first smoothing factor; ratio(n+1,k) is a sub-energy ratio between a first energy of a (n+1)-th frame error sub-signal in a k-th sub-band and a second energy of a (n+1)-th frame filtered sub-signal in the k-th sub-band; ratio_short_sm(n+1,k) is a first sub-energy smoothing ratio obtained after performing a first smoothing processing performed on ratio(n+1,k); ratio_ short_sm(n,k) is a first sub-energy smoothing ratio obtained after performing a first smoothing processing on ratio(n,k); ratio(n,k) is a sub-energy ratio between a first energy of an n-th frame error sub-signal in the k-th sub-band and a second energy of an n-th frame filtered sub-signal in the k-th sub-band; n is a positive integer, and n≤N−1; k is a positive integer, and k≤N, ratio_short_sm(1,k) is equal to ratio(1,k), ratio(1, k) is a sub-energy ratio between a first energy of a first frame error sub-signal in the k-th sub-band and a second energy of a first frame filtered sub-signal in the k-th sub-band.

4. The method according to claim 2, wherein the second smoothing processing is performed on the M first energy smoothing ratios with the following formula:

$$\text{ratio\_long\_}sm(n+1,k)=\beta*\text{ratio\_long\_}sm(n,k)+(1-\beta)\\*\text{ratio\_short\_}sm(n+1,k)$$

wherein β is a second smoothing factor, ratio_long_sm(n+1,k) is a second sub-energy smoothing ratio obtained after performing a second smoothing processing on ratio_short_sm(n+1,k); ratio_short_sm(n+1,k) is a first sub-energy smoothing ratio obtained after performing a first smoothing processing on ratio(n+1,k); ratio(n+1,k) is a sub-energy ratio between a first energy of a (n+1)-th frame error sub-signal in a k-th sub-band and a second energy of a (n+1)-th frame filtered sub-signal in the k-th sub-band; ratio_long_sm(n,k) is a second sub-energy smoothing ratio obtained after performing a second smoothing processing on ratio_short_sm(n,k); ratio_short_sm(n,k) is a first sub-energy smoothing ratio obtained after performing a first smoothing processing on ratio(n,k); ratio(n,k) is a sub-energy ratio between a first energy of an n-th frame error sub-signal in the k-th sub-band and a second energy of an n-th frame filtered sub-signal in the k-th sub-band; n is a positive integer, and n≤N−1; k is a positive integer, and k≤M, ratio_long_sm(1,k) is equal to ratio_short_sm(1,k).

5. The method according to claim 1, wherein the performing double-talk state detection according to the signal-to-noise ratios of the M energy ratios and a preset threshold to determine the state of the input signal, comprises:
calculating a total sum of signal-to-noise ratios of I energy ratios in the signal-to-noise ratios of the M energy ratios, wherein I is a positive integer, and I≤M;
in case that the total sum is greater than the preset threshold, determining that the input signal is in a double-talk state, or, in case that the total sum is less than or equal to the preset threshold, determining that the input signal is in a single-talk state.

6. An electronic device, comprising:
at least one processor; and
a memory communicatively connected to the at least one processor; wherein,
the memory stores instructions executable by the at least one processor to enable the at least one processor to implement:
calculating an energy ratio between a first energy of an error signal in each sub-band of M sub-bands and a second energy of a filtered signal in the same sub-band as the error signal, thereby obtaining M energy ratios; wherein the error signal is a difference between an input signal collected by a microphone and the filtered signal, the filtered signal is a signal obtained after performing filtering process on a reference signal, and M is a positive integer;
performing a first smoothing processing on the M energy ratios to obtain M first energy smoothing ratios, and performing a second smoothing processing on the M first energy smoothing ratios to obtain M second energy smoothing ratios;
performing double-talk state detection based on the M first energy smoothing ratios and the M second energy smoothing ratios to determine a state of the input signal;
wherein the at least one processor is further configured to:
predict noise of the M second energy smoothing ratios according to the M second energy smoothing ratios;
obtain signal-to-noise ratios of the M energy ratios according to the M first energy smoothing ratios and the noise of the M second energy smoothing ratios;
perform double-talk state detection according to the signal-to-noise ratios of the M energy ratios and a preset threshold to determine the state of the input signal.

7. The electronic device according to claim 6, wherein the filtered signal comprises N frame filtered sub-signals, and the error signal comprises N frame error sub-signals, where N is a positive integer;
an energy ratio in a target sub-band comprises N sub-energy ratios in the target sub-band; the N sub-energy ratios in the target sub-band comprises an energy ratio between a first energy of each frame error sub-signal in the target sub-band and a second energy of a corresponding frame filtered sub-signal in the target sub-band; a first energy smoothing ratio in the target sub-band comprises N first sub-energy smoothing ratios obtained after performing a first smoothing processing on the N sub-energy ratios; a second energy smoothing ratio in the target sub-band comprises N second sub-energy smoothing ratios obtained after performing a second smoothing processing on the N first sub-energy smoothing ratios; the target sub-band is any sub-band of the M sub-bands.

8. The electronic device according to claim 7, wherein the at least one processor is further configured to perform the first smoothing processing on the M energy ratios with the following formula:

$$\text{ratio\_short\_}sm(n+1,k)=\alpha*\text{ratio\_short\_}sm(n,k)+(1-\alpha)\\*\text{ratio}(n+1,k)$$

wherein α is a first smoothing factor; ratio(n+1,k) is a sub-energy ratio between a first energy of a (n+1)-th frame error sub-signal in a k-th sub-band and a second energy of a (n+1)-th frame filtered sub-signal in the k-th sub-band; ratio_short_sm(n+1,k) is a first sub-energy smoothing ratio obtained after performing a first smoothing processing performed on ratio(n+1,k); ratio_ short_sm(n,k) is a first sub-energy smoothing ratio obtained after performing a first smoothing processing on ratio(n,k); ratio(n,k) is a sub-energy ratio between a first energy of an n-th frame error sub-signal in the k-th sub-band and a second energy of an n-th frame filtered sub-signal in the k-th sub-band; n is a positive integer, and n≤N−1; k is a positive integer, and k≤M, ratio_short_sm(1,k) is equal to ratio(1,k), ratio (1,k) is a sub-energy ratio between a first energy of a first frame error sub-signal in the k-th sub-band and a second energy of a first frame filtered sub-signal in the k-th sub-band.

9. The electronic device according to claim 7, wherein the at least one processor is further configured to perform the second smoothing processing on the M energy smoothing ratios with the following formula:

$$\text{ratio\_long\_}sm(n+1,k)=\beta*\text{ratio\_long\_}sm(n,k)+(1-\beta)\\*\text{ratio\_short\_}sm(n+1,k)$$

wherein β is a second smoothing factor, ratio_long_sm (n+1,k) is a second sub-energy smoothing ratio obtained after performing a second smoothing processing on ratio_short_sm(n+1,k); ratio_short_sm(n+1,k) is a first sub-energy smoothing ratio obtained after performing a first smoothing processing on ratio(n+1,k); ratio(n+1,k) is a sub-energy ratio between a first energy of a (n+1)-th frame error sub-signal in a k-th sub-band and a second energy of a (n+1)-th frame filtered sub-signal in the k-th sub-band; ratio_long_sm(n,k) is a second sub-energy smoothing ratio obtained after performing a second smoothing processing on ratio_short_sm(n,k); ratio_short_sm(n,k) is a first sub-energy smoothing ratio obtained after performing a first smoothing processing on ratio(n,k); ratio(n,k) is a sub-energy ratio between a first energy of an n-th frame error sub-signal in the k-th sub-band and a second energy of an n-th frame filtered sub-signal in the k-th sub-band; n is a positive integer, and n≤N−1; k is a positive integer, and k≤M, ratio_long_sm(1,k) is equal to ratio_short_sm(1,k).

10. The electronic device according to claim 6, wherein the at least one processor is further configured to:
calculate a total sum of signal-to-noise ratios of I energy ratios in the signal-to-noise ratios of the M energy ratios, wherein I is a positive integer, and I≤M;
in case that the total sum is greater than the preset threshold, determine that the input signal is in a double-talk state, or, in case that the total sum is less than or equal to the preset threshold, determine that the input signal is in a single-talk state.

11. A non-transitory computer-readable storage medium storing computer instructions for causing the computer to:
calculate an energy ratio between a first energy of an error signal in each sub-band of M sub-bands and a second energy of a filtered signal in the same sub-band as the error signal, thereby obtaining M energy ratios; wherein the error signal is a difference between an input signal collected by a microphone and the filtered signal, the filtered signal is a signal obtained after performing filtering process on a reference signal, and M is a positive integer;
perform a first smoothing processing on the M energy ratios to obtain M first energy smoothing ratios, and performing a second smoothing processing on the M first energy smoothing ratios to obtain M second energy smoothing ratios;
perform double-talk state detection based on the M first energy smoothing ratios and the M second energy smoothing ratios to determine a state of the input signal;
wherein the computer instructions are configured to cause the computer to,
predict noise of the M second energy smoothing ratios according to the M second energy smoothing ratios;
obtain signal-to-noise ratios of the M energy ratios according to the M first energy smoothing ratios and the noise of the M second energy smoothing ratios;
perform double-talk state detection according to the signal-to-noise ratios of the M energy ratios and a preset threshold to determine the state of the input signal.

12. The non-transitory computer-readable storage medium according to claim 11, wherein the filtered signal comprises N frame filtered sub-signals, and the error signal comprises N frame error sub-signals, where N is a positive integer;
an energy ratio in a target sub-band comprises N sub-energy ratios in the target sub-band; the N sub-energy ratios in the target sub-band comprises an energy ratio between a first energy of each frame error sub-signal in the target sub-band and a second energy of a corresponding frame filtered sub-signal in the target sub-band; a first energy smoothing ratio in the target sub-band comprises N first sub-energy smoothing ratios obtained after performing a first smoothing processing on the N sub-energy ratios; a second energy smoothing ratio in the target sub-band comprises N second sub-energy smoothing ratios obtained after performing a second smoothing processing on the N first sub-energy smoothing ratios; the target sub-band is any sub-band of the M sub-bands.

13. The non-transitory computer-readable storage medium according to claim 12, wherein the computer instructions are further configured to cause the computer to perform the first smoothing processing on the M energy ratios with the following formula:

$$\text{ratio\_short\_}sm(n+1,k)=\alpha*\text{ratio\_short\_}sm(n,k)+(1-\alpha)*\text{ratio}(n+1,k)$$

wherein α is a first smoothing factor; ratio(n+1,k) is a sub-energy ratio between a first energy of a (n+1)-th frame error sub-signal in a k-th sub-band and a second energy of a (n+1)-th frame filtered sub-signal in the k-th sub-band; ratio_short_sm(n+1,k) is a first sub-energy smoothing ratio obtained after performing a first smoothing processing performed on ratio(n+1,k); ratio_ short_sm(n,k) is a first sub-energy smoothing ratio obtained after performing a first smoothing processing on ratio(n,k); ratio(n,k) is a sub-energy ratio between a first energy of an n-th frame error sub-signal in the k-th sub-band and a second energy of an n-th frame filtered sub-signal in the k-th sub-band; n is a positive integer, and n≤N−1; k is a positive integer, and k≤M ratio_ short_sm(1,k) is equal to ratio(1,k), ratio (1,k) is a sub-energy ratio between a first energy of a first frame error sub-signal in the k-th sub-band and a second energy of a first frame filtered sub-signal in the k-th sub-band.

14. The non-transitory computer-readable storage medium according to claim 12, wherein the computer instructions are further configured to cause the computer to perform the second smoothing processing on the M first energy smoothing ratios with the following formula:

$$\text{ratio\_long\_}sm(n+1,k)=\beta*\text{ratio\_long\_}sm(n,k)+(1-\beta)*\text{ratio\_short\_}sm(n+1,k)$$

wherein β is a second smoothing factor, ratio_long_sm(n+1,k) is a second sub-energy smoothing ratio obtained after performing a second smoothing processing on ratio_short_sm(n+1,k); ratio_short_sm(n+1,k) is a first sub-energy smoothing ratio obtained after performing a first smoothing processing on ratio(n+1,k); ratio(n+1,k) is a sub-energy ratio between a first energy of a (n+1)-th frame error sub-signal in a k-th sub-band and a second energy of a (n+1)-th frame filtered sub-signal in the k-th sub-band; ratio_long_sm(n,k) is a second sub-energy smoothing ratio obtained after performing a second smoothing processing on ratio_short_sm (n,k); ratio_short_sm(n,k) is a first sub-energy smoothing ratio obtained after performing a first smoothing processing on ratio(n,k); ratio(n,k) is a sub-energy ratio between a first energy of an n-th frame error sub-signal in the k-th sub-band and a second energy of an n-th frame filtered sub-signal in the k-th sub-band; n is a positive integer, and n≤N−1; k is a positive integer, and k≤M, ratio_long_sm(1,k) is equal to ratio_short_sm(1,k).

15. The non-transitory computer-readable storage medium according to claim 11, wherein the computer instructions are further configured to cause the computer to:

calculate a total sum of signal-to-noise ratios of I energy ratios in the signal-to-noise ratios of the M energy ratios, wherein I is a positive integer, and $I \leq M$;

in case that the total sum is greater than the preset threshold, determining that the input signal is in a double-talk state, or, in case that the total sum is less than or equal to the preset threshold, determining that the input signal is in a single-talk state.

\* \* \* \* \*